United States Patent
Bertness

(10) Patent No.: US 6,696,819 B2
(45) Date of Patent: Feb. 24, 2004

(54) BATTERY CHARGE CONTROL DEVICE

(75) Inventor: Kevin I. Bertness, Batavia, IL (US)

(73) Assignee: Midtronics, Inc., Willowbrook, IL (US)

( * ) Notice: Subject to any disclaimer, the term of this patent is extended or adjusted under 35 U.S.C. 154(b) by 0 days.

(21) Appl. No.: 10/042,451

(22) Filed: Jan. 8, 2002

(65) Prior Publication Data

US 2003/0128011 A1 Jul. 10, 2003

(51) Int. Cl.$^7$ ................................................ H02J 7/00
(52) U.S. Cl. ........................................ 320/134; 320/128
(58) Field of Search ................................. 320/134, 128, 320/137, 150, 151, 152, 153, 155, 158, 159, 149; 324/426, 427, 431

(56) References Cited

U.S. PATENT DOCUMENTS

| | | | |
|---|---|---|---|
| 2,514,745 A | 7/1950 | Dalzell | 171/95 |
| 3,356,936 A | 12/1967 | Smith | 324/29.5 |
| 3,562,634 A | 2/1971 | Latner | 31/4 |
| 3,593,099 A | 7/1971 | Scholl | 320/13 |
| 3,607,673 A | 9/1971 | Seyl | 204/1 |
| 3,676,770 A | 7/1972 | Sharaf et al. | 324/29.5 |
| 3,729,989 A | 5/1973 | Little | 73/133 |
| 3,753,094 A | 8/1973 | Furuishi et al. | 324/29.5 |
| 3,808,522 A | 4/1974 | Sharaf | 324/29.5 |
| 3,811,089 A | 5/1974 | Strezelewicz | 324/170 |
| 3,873,911 A | 3/1975 | Champlin | 324/29.5 |
| 3,876,931 A | 4/1975 | Godshalk | 324/29.5 |
| 3,886,443 A | 5/1975 | Miyakawa et al. | 324/29.5 |
| 3,889,248 A | 6/1975 | Ritter | 340/249 |
| 3,906,329 A | 9/1975 | Bader | 320/44 |

(List continued on next page.)

FOREIGN PATENT DOCUMENTS

| | | |
|---|---|---|
| DE | 29 26 716 B1 | 1/1981 |
| EP | 0 022 450 A1 | 1/1981 |
| EP | 0 637 754 A1 | 2/1995 |
| EP | 0 772 056 A1 | 5/1997 |
| FR | 2 749 397 | 12/1997 |
| GB | 2 088 159 A | 6/1982 |
| JP | 59-17892 | 1/1984 |
| JP | 59-17893 | 1/1984 |
| JP | 59-17894 | 1/1984 |
| JP | 59017894 | 1/1984 |

(List continued on next page.)

OTHER PUBLICATIONS

"Electrochemical Impedance Spectroscopy in Battery Development and Testing", *Batteries International*, Apr. 1997, pp. 59 and 62–63.

"Battery Impedance", by E. Willihnganz et al., *Electrical Engineering*, Sep. 1959, pp. 922–925.

(List continued on next page.)

*Primary Examiner*—Michael Sherry
*Assistant Examiner*—Lawrence Luk
(74) *Attorney, Agent, or Firm*—Westman, Champlin & Kelly

(57) ABSTRACT

A charge control device for providing a constant charge voltage with temperature compensation to a battery being charged by a constant current charger is provided. The device includes a first electrical connector that couples to a positive terminal of the battery and a second electrical connector that couples to a negative terminal of the battery. A current bypass circuit electrically couples to the positive and negative terminals of the battery through respective first and second electrical connectors. The current bypass circuit includes a bypass path for a portion of a charge current from the constant current charger to flow, thereby maintaining a substantially constant voltage across the battery terminals at a particular temperature.

13 Claims, 3 Drawing Sheets

U.S. PATENT DOCUMENTS

| | | | |
|---|---|---|---|
| 3,909,708 A | 9/1975 | Champlin | 324/29.5 |
| 3,936,744 A | 2/1976 | Perlmutter | 324/158 |
| 3,946,299 A | 3/1976 | Christianson et al. | 320/43 |
| 3,947,757 A | 3/1976 | Grube et al. | 324/28 |
| 3,969,667 A | 7/1976 | McWilliams | 324/29.5 |
| 3,979,664 A | 9/1976 | Harris | 324/17 |
| 3,984,762 A | 10/1976 | Dowgiallo, Jr. | 324/29.5 |
| 3,984,768 A | 10/1976 | Staples | 324/62 |
| 3,989,544 A | 11/1976 | Santo | 429/65 |
| 4,008,619 A | 2/1977 | Alcaide et al. | 73/398 |
| 4,024,953 A | 5/1977 | Nailor, III | 206/344 |
| 4,047,091 A | 9/1977 | Hutchines et al. | 363/59 |
| 4,053,824 A | 10/1977 | Dupuis et al. | 324/29.5 |
| 4,070,624 A | 1/1978 | Taylor | 327/158 |
| 4,086,531 A | 4/1978 | Bernier | 324/158 |
| 4,112,351 A | 9/1978 | Back et al. | 324/16 |
| 4,114,083 A | 9/1978 | Benham et al. | 320/39 |
| 4,126,874 A | 11/1978 | Suzuki et al. | 354/60 |
| 4,178,546 A | 12/1979 | Hulls et al. | 324/158 |
| 4,193,025 A | 3/1980 | Frailing et al. | 324/427 |
| 4,207,611 A | 6/1980 | Gordon | 364/580 |
| 4,217,645 A | 8/1980 | Barry et al. | 364/483 |
| 4,297,639 A | 10/1981 | Branham | 324/429 |
| 4,315,204 A | 2/1982 | Sievers et al. | 322/28 |
| 4,316,185 A | 2/1982 | Watrous et al. | 340/636 |
| 4,322,685 A | 3/1982 | Frailing et al. | 324/429 |
| 4,351,405 A | 9/1982 | Fields et al. | 180/65 |
| 4,361,809 A | 11/1982 | Bil et al. | 324/426 |
| 4,363,407 A | 12/1982 | Barkler et al. | 209/3.3 |
| 4,369,407 A | 1/1983 | Korbell | 324/416 |
| 4,379,989 A | 4/1983 | Kurz et al. | 320/26 |
| 4,379,990 A | 4/1983 | Sievers et al. | 322/99 |
| 4,390,828 A | 6/1983 | Converse et al. | 320/32 |
| 4,392,101 A | 7/1983 | Saar et al. | 320/20 |
| 4,396,880 A | 8/1983 | Windebank | 320/21 |
| 4,408,157 A | 10/1983 | Beaubien | 324/62 |
| 4,412,169 A | 10/1983 | Dell'Orto | 320/64 |
| 4,423,378 A | 12/1983 | Marino et al. | 324/427 |
| 4,423,379 A | 12/1983 | Jacobs et al. | 324/429 |
| 4,424,491 A | 1/1984 | Bobbett et al. | 324/433 |
| 4,459,548 A | 7/1984 | Lentz et al. | 324/158 |
| 4,514,694 A | 4/1985 | Finger | 324/429 |
| 4,520,353 A | 5/1985 | McAuliffe | 340/636 |
| 4,633,418 A | 12/1986 | Bishop | 364/554 |
| 4,659,977 A | 4/1987 | Kissel et al. | 320/64 |
| 4,663,580 A | 5/1987 | Wortman | 320/35 |
| 4,665,370 A | 5/1987 | Holland | 324/429 |
| 4,667,143 A | 5/1987 | Cooper et al. | 320/22 |
| 4,667,279 A | 5/1987 | Maier | 363/46 |
| 4,678,998 A | 7/1987 | Muramatsu | 324/427 |
| 4,679,000 A | 7/1987 | Clark | 324/428 |
| 4,680,528 A | 7/1987 | Mikami et al. | 320/32 |
| 4,697,134 A | 9/1987 | Burkum et al. | 320/48 |
| 4,707,795 A | 11/1987 | Alber et al. | 364/550 |
| 4,709,202 A | 11/1987 | Koenck et al. | 320/43 |
| 4,710,861 A | 12/1987 | Kanner | 363/46 |
| 4,719,428 A | 1/1988 | Liebermann | 324/436 |
| 4,743,855 A | 5/1988 | Randin et al. | 324/430 |
| 4,745,349 A | 5/1988 | Palanisamy et al. | 320/22 |
| 4,816,768 A | 3/1989 | Champlin | 324/428 |
| 4,820,966 A | 4/1989 | Fridman | 320/32 |
| 4,825,170 A | 4/1989 | Champlin | 324/436 |
| 4,847,547 A | 7/1989 | Eng, Jr. et al. | 320/35 |
| 4,849,700 A | 7/1989 | Morioka et al. | 324/427 |
| 4,876,495 A | 10/1989 | Palanisamy et al. | 320/18 |
| 4,881,038 A | 11/1989 | Champlin | 324/426 |
| 4,912,416 A | 3/1990 | Champlin | 324/430 |
| 4,913,116 A | 4/1990 | Katogi et al. | 123/425 |
| 4,929,931 A | 5/1990 | McCuen | 340/636 |
| 4,931,738 A | 6/1990 | MacIntyre et al. | 324/435 |
| 4,937,528 A | 6/1990 | Palanisamy | 324/430 |
| 4,947,124 A | 8/1990 | Hauser | 324/430 |
| 4,956,597 A | 9/1990 | Heavey et al. | 320/14 |
| 4,968,941 A | 11/1990 | Rogers | 324/428 |
| 4,968,942 A | 11/1990 | Palanisamy | 324/430 |
| 5,004,979 A | 4/1991 | Marino et al. | 324/160 |
| 5,032,825 A | 7/1991 | Xuznicki | 340/636 |
| 5,037,778 A | 8/1991 | Stark et al. | 437/216 |
| 5,047,722 A | 9/1991 | Wurst et al. | 324/430 |
| 5,087,881 A | 2/1992 | Peacock | 324/378 |
| 5,095,223 A | 3/1992 | Thomas | 307/110 |
| 5,126,675 A | 6/1992 | Yang | 324/435 |
| 5,140,269 A | 8/1992 | Champlin | 324/433 |
| 5,144,218 A | 9/1992 | Bosscha | 320/44 |
| 5,144,248 A | 9/1992 | Alexandres et al. | 324/428 |
| 5,160,881 A | 11/1992 | Schramm et al. | 322/7 |
| 5,170,124 A | 12/1992 | Blair et al. | 324/434 |
| 5,179,335 A | 1/1993 | Nor | 320/21 |
| 5,194,799 A | 3/1993 | Tomantschger | 320/2 |
| 5,204,611 A | 4/1993 | Nor et al. | 320/21 |
| 5,214,370 A | 5/1993 | Harm et al. | 320/35 |
| 5,214,385 A | 5/1993 | Gabriel et al. | 324/434 |
| 5,241,275 A | 8/1993 | Fang | 324/430 |
| 5,254,952 A | 10/1993 | Salley et al. | 324/429 |
| 5,266,880 A | 11/1993 | Newland | 320/14 |
| 5,281,919 A | 1/1994 | Palanisamy | 324/427 |
| 5,281,920 A | 1/1994 | Wurst | 324/430 |
| 5,295,078 A | 3/1994 | Stich et al. | 364/483 |
| 5,298,797 A | 3/1994 | Redl | 307/246 |
| 5,300,874 A | 4/1994 | Shimamoto et al. | 320/15 |
| 5,302,902 A | 4/1994 | Groehl | 324/434 |
| 5,315,287 A | 5/1994 | Sol | 340/455 |
| 5,321,626 A | 6/1994 | Palladino | 364/483 |
| 5,331,268 A | 7/1994 | Patino et al. | 320/20 |
| 5,336,993 A | 8/1994 | Thomas et al. | 324/158.1 |
| 5,338,515 A | 8/1994 | Dalla Betta et al. | 422/95 |
| 5,339,018 A | 8/1994 | Brokaw | 320/35 |
| 5,343,380 A | 8/1994 | Champlin | 363/46 |
| 5,347,163 A | 9/1994 | Yoshimura | 307/66 |
| 5,352,968 A | 10/1994 | Reni et al. | 320/35 |
| 5,365,160 A | 11/1994 | Leppo et al. | 320/22 |
| 5,365,453 A | 11/1994 | Startup et al. | 364/481 |
| 5,381,096 A | 1/1995 | Hirzel | 324/427 |
| 5,412,323 A | 5/1995 | Kato et al. | 324/429 |
| 5,426,371 A | 6/1995 | Salley et al. | 324/429 |
| 5,426,416 A | 6/1995 | Jefferies et al. | 340/664 |
| 5,432,426 A | 7/1995 | Yoshida | 320/20 |
| 5,434,495 A | 7/1995 | Toko | 320/44 |
| 5,435,185 A | 7/1995 | Eagan | 73/587 |
| 5,442,274 A | 8/1995 | Tamai | 320/23 |
| 5,445,026 A | 8/1995 | Eagan | 73/591 |
| 5,449,996 A | 9/1995 | Matsumoto et al. | 320/20 |
| 5,449,997 A | 9/1995 | Gilmore et al. | 320/39 |
| 5,451,881 A | 9/1995 | Finger | 324/433 |
| 5,457,377 A | 10/1995 | Jonsson | 320/5 |
| 5,469,043 A | 11/1995 | Cherng et al. | 320/31 |
| 5,485,090 A | 1/1996 | Stephens | 324/433 |
| 5,488,300 A | 1/1996 | Jamieson | 324/432 |
| 5,519,383 A | 5/1996 | De La Rosa | 340/636 |
| 5,528,148 A | 6/1996 | Rogers | 324/426 |
| 5,537,967 A | 7/1996 | Tashiro et al. | 123/792.1 |
| 5,546,317 A | 8/1996 | Andrieu | 364/481 |
| 5,548,273 A | 8/1996 | Nicol et al. | 340/439 |
| 5,550,485 A | 8/1996 | Falk | 324/772 |
| 5,561,380 A | 10/1996 | Sway-Tin et al. | 324/509 |
| 5,562,501 A | 10/1996 | Kinoshita et al. | 439/852 |
| 5,572,136 A | 11/1996 | Champlin | 324/426 |
| 5,574,355 A | 11/1996 | McShane et al. | 320/39 |
| 5,583,416 A | 12/1996 | Klang | 320/22 |
| 5,585,728 A | 12/1996 | Champlin | 324/427 |
| 5,589,757 A | 12/1996 | Klang | 320/22 |

| | | | |
|---|---|---|---|
| 5,592,093 A | 1/1997 | Klingbiel | 324/426 |
| 5,596,260 A | 1/1997 | Moravec et al. | 320/30 |
| 5,598,098 A | 1/1997 | Champlin | 324/430 |
| 5,602,462 A | 2/1997 | Stich et al. | 323/258 |
| 5,606,242 A | 2/1997 | Hull et al. | 320/48 |
| 5,621,298 A | 4/1997 | Harvey | 320/5 |
| 5,633,985 A | 5/1997 | Severson et al. | 395/2.76 |
| 5,637,978 A | 6/1997 | Kellett et al. | 320/2 |
| 5,642,031 A | 6/1997 | Brotto | 320/21 |
| 5,650,937 A | 7/1997 | Bounaga | 364/483 |
| 5,652,501 A | 7/1997 | McClure et al. | 320/17 |
| 5,653,659 A | 8/1997 | Kunibe et al. | 477/111 |
| 5,656,920 A | 8/1997 | Cherng et al. | 320/31 |
| 5,675,234 A | 10/1997 | Greene | 320/15 |
| 5,677,077 A | 10/1997 | Faulk | 429/90 |
| 5,699,050 A | 12/1997 | Kanazawa | 340/636 |
| 5,701,089 A | 12/1997 | Perkins | 327/772 |
| 5,705,929 A | 1/1998 | Caravello et al. | 324/430 |
| 5,710,503 A | 1/1998 | Sideris et al. | 320/6 |
| 5,711,648 A | 1/1998 | Hammerslag | 414/786 |
| 5,717,336 A | 2/1998 | Basell et al. | 324/430 |
| 5,717,937 A | 2/1998 | Fritz | 395/750.01 |
| 5,739,667 A | 4/1998 | Matsuda et al. | 320/5 |
| 5,747,909 A | 5/1998 | Syverson et al. | 310/156 |
| 5,754,417 A | 5/1998 | Nicollini | 363/60 |
| 5,757,192 A | 5/1998 | McShane et al. | 324/427 |
| 5,760,587 A | 6/1998 | Harvey | 324/434 |
| 5,773,978 A | 6/1998 | Becker | 324/430 |
| 5,789,899 A | 8/1998 | van Phuoc et al. | 320/30 |
| 5,793,359 A | 8/1998 | Ushikubo | 345/169 |
| 5,808,469 A | 9/1998 | Kopera | 324/43.4 |
| 5,818,234 A | 10/1998 | McKinnon | 324/433 |
| 5,821,756 A | 10/1998 | McShane et al. | 324/430 |
| 5,825,174 A | 10/1998 | Parker | 324/106 |
| 5,831,435 A | 11/1998 | Troy | 324/426 |
| 5,862,515 A | 1/1999 | Kobayashi et al. | 702/63 |
| 5,872,443 A | 2/1999 | Williamson | 320/21 |
| 5,895,440 A | 4/1999 | Proctor et al. | 702/63 |
| 5,914,605 A | 6/1999 | Bertness | 324/430 |
| 5,927,938 A | 7/1999 | Hammerslag | 414/809 |
| 5,929,609 A | 7/1999 | Joy et al. | 322/25 |
| 5,939,855 A | 8/1999 | Proctor et al. | 320/104 |
| 5,939,861 A | 8/1999 | Joko et al. | |
| 5,945,829 A | 8/1999 | Bertness | 324/430 |
| 5,951,229 A | 9/1999 | Hammerslag | 414/398 |
| 5,961,561 A | 10/1999 | Wakefield, II | 701/29 |
| 5,961,604 A | 10/1999 | Anderson et al. | 709/229 |
| 5,969,625 A | 10/1999 | Russo | 340/636 |
| 6,002,238 A | 12/1999 | Champlin | 320/134 |
| 6,008,652 A | 12/1999 | Theofanopoulos et al. | 324/434 |
| 6,009,369 A | 12/1999 | Boisvert et al. | 701/99 |
| 6,031,354 A | 2/2000 | Wiley et al. | 320/116 |
| 6,037,751 A | 3/2000 | Klang | 320/160 |
| 6,037,777 A | 3/2000 | Champlin | 324/430 |
| 6,046,514 A * | 4/2000 | Rouillard et al. | 307/77 |
| 6,051,976 A | 4/2000 | Bertness | 324/426 |
| 6,072,299 A | 6/2000 | Kurie et al. | 320/112 |
| 6,072,300 A | 6/2000 | Tsuji | 320/116 |
| 6,081,098 A | 6/2000 | Bertness et al. | 320/134 |
| 6,091,245 A | 7/2000 | Bertness | 324/426 |
| 6,094,033 A | 7/2000 | Ding et al. | 320/132 |
| 6,104,167 A | 8/2000 | Bertness et al. | 320/132 |
| 6,114,834 A | 9/2000 | Parise | 320/109 |
| 6,137,269 A | 10/2000 | Champlin | 320/150 |
| 6,140,797 A | 10/2000 | Dunn | 320/105 |
| 6,144,185 A | 11/2000 | Dougherty et al. | 320/132 |
| 6,150,793 A | 11/2000 | Lesesky et al. | 320/104 |
| 6,161,640 A | 12/2000 | Yamaguchi | 180/65.8 |
| 6,163,156 A | 12/2000 | Bertness | 324/426 |
| 6,172,483 B1 | 1/2001 | Champlin | 320/134 |
| 6,172,505 B1 | 1/2001 | Bertness | 324/430 |
| 6,181,545 B1 | 1/2001 | Amatucci et al. | 361/502 |
| 6,211,651 B1 * | 4/2001 | Nemoto | 320/133 |
| 6,222,369 B1 | 4/2001 | Champlin | 324/430 |
| 6,225,808 B1 | 5/2001 | Varghese et al. | 324/426 |
| 6,236,332 B1 | 5/2001 | Conkright et al. | 340/825.06 |
| 6,249,124 B1 | 6/2001 | Bertness | 324/426 |
| 6,250,973 B1 | 6/2001 | Lowery et al. | 439/743 |
| 6,254,438 B1 | 7/2001 | Gaunt | 439/755 |
| 6,259,254 B1 | 7/2001 | Klang | 324/427 |
| 6,262,563 B1 | 7/2001 | Champlin | 320/134 |
| 6,294,896 B1 | 9/2001 | Champlin | 320/134 |
| 6,294,897 B1 | 9/2001 | Champlin | 320/153 |
| 6,304,087 B1 | 10/2001 | Bertness | 324/426 |
| 6,307,349 B1 | 10/2001 | Koenck et al. | 320/112 |
| 6,310,481 B2 | 10/2001 | Bertness | 324/430 |
| 6,313,607 B1 | 11/2001 | Champlin | 320/132 |
| 6,313,608 B1 | 11/2001 | Varghese et al. | 32/132 |
| 6,316,914 B1 | 11/2001 | Bertness | 320/134 |
| 6,346,795 B2 | 2/2002 | Haraguchi et al. | 320/136 |
| 6,347,958 B1 | 2/2002 | Tsai | 439/488 |
| 6,351,102 B1 | 2/2002 | Troy | 320/139 |
| 6,359,441 B1 | 3/2002 | Bertness | 324/426 |
| 6,363,303 B1 | 3/2002 | Bertness | 701/29 |
| 6,384,608 B1 | 5/2002 | Namaky | 324/425 |
| 6,388,448 B1 | 5/2002 | Cervas | 324/426 |
| 6,392,414 B2 | 5/2002 | Bertness | 324/429 |
| 6,411,098 B1 | 6/2002 | Laletin | 324/436 |
| 6,417,669 B1 | 7/2002 | Champlin | 324/426 |
| 6,424,158 B2 | 7/2002 | Klang | 324/433 |
| 6,441,585 B1 | 8/2002 | Bertness | 320/132 |
| 6,445,158 B1 | 9/2002 | Bertness et al. | 320/104 |
| 6,456,045 B1 | 9/2002 | Troy et al. | 320/139 |
| 6,466,025 B1 | 10/2002 | Klang | 324/429 |
| 6,466,026 B1 | 10/2002 | Champlin | 324/430 |
| 6,531,848 B1 * | 3/2003 | Chitsazan et al. | 320/153 |

FOREIGN PATENT DOCUMENTS

| | | |
|---|---|---|
| JP | 59215674 | 12/1984 |
| JP | 60225078 | 11/1985 |
| JP | 62-180284 | 8/1987 |
| JP | 63027776 | 2/1988 |
| JP | 03274479 | 12/1991 |
| JP | 03282276 | 12/1991 |
| JP | 4-8636 | 1/1992 |
| JP | 04131779 | 5/1992 |
| JP | 04372536 | 12/1992 |
| JP | 5216550 | 8/1993 |
| JP | 7-128414 | 5/1995 |
| WO | WO 93/22666 | 11/1993 |
| WO | WO 94/05069 | 3/1994 |
| WO | WO 98/58270 | 12/1998 |
| WO | WO 99/23738 | 5/1999 |

OTHER PUBLICATIONS

"Determining The End of Battery Life", by S. DeBardelaben, *IEEE*, pp. 365–368.

"A Look at the Impedance of a Cell", by S. Debardelaben, *IEEE*, 1988, pp. 394–397.

"The Impedance of Electrical Storage Cells", by N.A. Hampson et al., *Journal of Applied Electrochemistry*, 1980, pp. 3–11.

"A Package for Impedance/Admittance Data Analysis", by B. Boukamp, *Solid State Ionics*, 1986, pp. 136–140.

"Precision of Impedance Spectroscopy Estimates of Bulk, Reaction Rate, and Diffusion Parameters", by J. Macdonald et al., *J. Electroanal, Chem.*, 1991, pp. 1–11.

Internal Resistance: Harbinger of Capacity Loss in Starved Electrolyte Sealed Lead Acid Batteries, by Vaccaro, F.J. et al., *AT&T Bell Laboratories,* 1987 IEEE, Ch. 2477, pp. 128,131.

IEEE Recommended Practice for Maintenance, Testings, and Replacement of Large Lead Storage Batteries for Generating Stations and Substations, *The Institute of Electrical and Electronics Engineers, Inc., ANSI/IEEE Sted.* 450–1987, Mar. 9, 1987, pp. 7–15.

"Field and Laboratory Studies to Assess the State of Health of Valve–Regulated Lead Acid Batteries: Part I Conductance/Capacity Correlation Studies", by D. Feder et al., *IEEE,* Aug. 1992, pp. 218–233.

"Battery Impedance", by E. Willihnganz et al., *Electrical Engineering,* Sep. 1959, pp. 922–925.

"JIS Japanese Industrial Standard–Lead Acid Batteries for Automobiles", *Japanese Standards Association UDC,* 632.355.2:629.113.006, Nov. 1995.

"Performance of Dry Cells", by C. Hambuechen, Preprint of *Am. Electrochem. Soc.,* Apr. 18–20, 1912, paper No. 19, pp. 1–5.

"A Bridge for Measuring Storage Battery Resistance", by E. Willihncanz, *The Electrochemical Society,* preprint 79–20, Apr. 1941, pp. 253–258.

National Semiconductor Corporation, "High Q Notch Filter", 3/69, Linear Brief 5, Mar. 1969.

Burr–Brown Corporation, "Design A 60 Hz Notch Filter with the UAF42", 1/94, AB–071, 1994.

National Semiconductor Corporation, "LMF90–$4^{th}$–Order Elliptic Notch Filter", 12/94, RRD–B30M115, Dec. 1994.

"Alligator Clips with Wire Penetrators" *J.S. Popper, Inc.* product information, downloaded from http://www.jspopper.com/, undated.

"#12: LM78S40 Simple Switcher DC to DC Converter", *ITM e–Catalog,* downloaded from http://www.pcbcafe.com, undated.

Simple DC–DC Converts Allows Use of Single Battery, *Electronix Express,* downloaded from http://www.elexp.com/t_dc–dc.htm, undated.

"DC–DC Converter Basics", *Power Designers,* download from http://www.powederdesigners.com/InforWeb.design_center/articles/DC–DC/converter.shtm, undated.

* cited by examiner

BATTERY CHARGE CONTROL DEVICE

BACKGROUND OF THE INVENTION

The present invention relates to rechargeable storage batteries. More specifically, the present invention relates to a charge control device used for such storage batteries.

Chemical batteries which create electricity from chemical reactions have been known for many years. Such batteries are becoming increasingly important and have found uses throughout industry. These uses include automobiles, UPS systems, etc.

One advantage of chemical batteries, such as lead-acid storage batteries, is that they can be charged and the chemical process reversed by forcing electricity through the battery. Charging systems are widely known in the art and are widely available in the consumer market. One of the most common techniques for recharging storage batteries is simply placing a voltage source across the battery having a voltage which is greater than the battery voltage. The voltage difference will cause a charging current to flow through the battery causing a reversal of the chemical reaction. The charging current decreases as the voltage difference between the charging voltage and the battery voltage decreases. Typically, the charging voltage is selected to be greater than the nominal battery voltage in order to cause a slight overcharge of the battery. The battery is deemed to be "charged" when the battery will accept no additional current. Frequently, this is through a simple visual inspection of an amp meter on the battery charger by the user of the battery charger. The battery charger may then be switched off. This constant voltage charging technique is relatively safe since as the charging process progresses, the charging current decreases until it is just a trickle.

A constant current charger is another type of charger used to charge rechargeable batteries. Constant current chargers vary the voltage they apply to the battery to maintain a constant current flow. As the current drops during the charging process, the charger automatically rises its voltage to keep the same current amplitude flowing. When the battery is fully charged, there must be some mechanism for stopping the constant current charger, otherwise, the battery would continue to charge and may lead to excessive overcharging of the battery that can permanently damage the battery and even lead to the boiling of the battery electrochemicals. On the other hand, undercharging of a battery results in a battery that is not capable of providing its full potential output. Thus, if a constant current charger is not shut off as soon as the battery is charged to an optimum level, one or more of the above-described problems could occur.

Another problem with battery charging is that the temperature of the battery typically rises during the recharging cycle. As the temperature of the battery increases, the chemical reactivity increases; the reactivity doubles approximately every 10 degrees Centigrade (or Celsius) for lead-acid batteries. Further, as the temperature of the battery increases, the internal resistance decreases so that the battery accepts a larger charging current at a given charging voltage. The increased current flow generates additional heating of the battery, further reducing its internal resistance. This cycle of battery heating followed by an increase in battery charging current results in a run-away condition which can damage the battery and cause it to fail.

Various types of battery testing and charging techniques are shown in U.S. Pat. No. 3,873,911, issued Mar. 25, 1975, to Champlin, entitled ELECTRONIC BATTERY TESTING DEVICE; U.S. Pat. No. 3,909,708, issued Sep. 30, 1975, to Champlin, entitled ELECTRONIC BATTERY TESTING DEVICE; U.S. Pat. No. 4,816,768, issued Mar. 28, 1989, to Champlin, entitled ELECTRONIC BATTERY TESTING DEVICE; U.S. Pat. No. 4,825,170, issued Apr. 25, 1989, to Champlin, entitled ELECTRONIC BATTERY TESTING DEVICE WITH AUTOMATIC VOLTAGE SCALING; U.S. Pat. No. 4,881,038, issued Nov. 14, 1989, to Champlin, entitled ELECTRONIC BATTERY TESTING DEVICE WITH AUTOMATIC VOLTAGE SCALING TO DETERMINE DYNAMIC CONDUCTANCE; U.S. Pat. No. 4,912,416, issued Mar. 27, 1990, to Champlin, entitled ELECTRONIC BATTERY TESTING DEVICE WITH STATE-OF-CHARGE COMPENSATION; U.S. Pat. No. 5,140,269, issued Aug. 18, 1992, to Champlin, entitled ELECTRONIC TESTER FOR ASSESSING BATTERY/CELL CAPACITY; U.S. Pat. No. 5,343,380, issued Aug. 30, 1994, entitled METHOD AND APPARATUS FOR SUPPRESSING TIME VARYING SIGNALS IN BATTERIES UNDERGOING CHARGING OR DISCHARGING; U.S. Pat. No. 5,572,136, issued Nov. 5, 1996, entitled ELECTRONIC BATTERY TESTER WITH AUTOMATIC COMPENSATION FOR LOW STATE-OF-CHARGE; U.S. Pat. No. 5,574,355, issued Nov. 12, 1996, entitled METHOD AND APPARATUS FOR DETECTION AND CONTROL OF THERMAL RUNAWAY IN A BATTERY UNDER CHARGE; U.S. Pat. No. 5,585,416, issued Dec. 10, 1996, entitled APPARATUS AND METHOD FOR STEP-CHARGING BATTERIES TO OPTIMIZE CHARGE ACCEPTANCE; U.S. Pat. No. 5,585,728, issued Dec. 17, 1996, entitled ELECTRONIC BATTERY TESTER WITH AUTOMATIC COMPENSATION FOR LOW STATE-OF-CHARGE; U.S. Pat. No. 5,589,757, issued Dec. 31, 1996, entitled APPARATUS AND METHOD FOR STEP-CHARGING BATTERIES TO OPTIMIZE CHARGE ACCEPTANCE; U.S. Pat. No. 5,592,093, issued Jan. 7, 1997, entitled ELECTRONIC BATTERY TESTING DEVICE LOOSE TERMINAL CONNECTION DETECTION VIA A COMPARISON CIRCUIT; U.S. Pat. No. 5,598,098, issued Jan. 28, 1997, entitled ELECTRONIC BATTERY TESTER WITH VERY HIGH NOISE IMMUNITY; U.S. Pat. No. 5,656,920, issued Aug. 12, 1997, entitled METHOD FOR OPTIMIZING THE CHARGING LEAD-ACID BATTERIES AND AN INTERACTIVE CHARGER; U.S. Pat. No. 5,757,192, issued May 26, 1998, entitled METHOD AND APPARATUS FOR DETECTING A BAD CELL IN A STORAGE BATTERY; U.S. Pat. No. 5,821,756, issued Oct. 13, 1998, entitled ELECTRONIC BATTERY TESTER WITH TAILORED COMPENSATION FOR LOW STATE-OF-CHARGE; U.S. Pat. No. 5,831,435, issued Nov. 3, 1998, entitled BATTERY TESTER FOR JIS STANDARD; U.S. Pat. No. 5,914,605, issued Jun. 22, 1999, entitled ELECTRONIC BATTERY TESTER; U.S. Pat. No. 5,945,829, issued Aug. 31, 1999, entitled MIDPOINT BATTERY MONITORING; U.S. Pat. No. 6,002,238, issued Dec. 14, 1999, entitled METHOD AND APPARATUS FOR MEASURING COMPLEX IMPEDANCE OF CELLS AND BATTERIES; U.S. Pat. No. 6,037,751, issued Mar. 14, 2000, entitled APPARATUS FOR CHARGING BATTERIES; U.S. Pat. No. 6,037,777, issued Mar. 14, 2000, entitled METHOD AND APPARATUS FOR DETERMINING BATTERY PROPERTIES FROM COMPLEX IMPEDANCE/ADMITTANCE; U.S. Pat. No. 6,051,976, issued Apr. 18, 2000, entitled METHOD AND APPARATUS FOR AUDITING A BATTERY TEST; U.S. Pat. No. 6,081,098, issued Jun. 27, 2000, entitled METHOD AND APPARATUS FOR CHARGING A BAT- TERY; U.S. Pat. No. 6,091,245, issued Jul. 18, 2000, entitled METHOD AND APPARATUS FOR AUDITING A BATTERY TEST; U.S. Pat. No. 6,104,167, issued Aug. 15, 2000, entitled METHOD AND APPARATUS FOR CHARGING A BATTERY; U.S. Pat. No. 6,137,269, issued Oct. 24, 2000, entitled METHOD AND APPARATUS FOR ELECTRONICALLY EVALUATING THE INTERNAL TEMPERATURE OF AN ELECTROCHEMICAL CELL OR BATTERY; U.S. Pat. No. 6,163,156, issued Dec. 19, 2000, entitled ELECTRICAL CONNECTION FOR ELECTRONIC BATTERY TESTER; U.S. Pat. No. 6,172,483, issued Jan. 9, 2001, entitled METHOD AND APPARATUS FOR MEASURING COMPLEX IMPEDANCE OF CELL AND BATTERIES; U.S. Pat. No. 6,172,505, issued Jan. 9, 2001, entitled ELECTRONIC BATTERY TESTER; U.S. Pat. No. 6,222,369, issued Apr. 24, 2001, entitled METHOD AND APPARATUS FOR DETERMINING BATTERY PROPERTIES FROM COMPLEX IMPEDANCE/ADMITTANCE; U.S. Pat. No. 6,225,808, issued May 1, 2001, entitled TEST COUNTER FOR ELECTRONIC BATTERY TESTER; U.S. Pat. No. 6,249,124, issued Jun. 19, 2001, entitled ELECTRONIC BATTERY TESTER WITH INTERNAL BATTERY; U.S. Pat. No. 6,259,254, issued Jul. 10, 2001, entitled APPARATUS AND METHOD FOR CARRYING OUT DIAGNOSTIC TESTS ON BATTERIES AND FOR RAPIDLY CHARGING BATTERIES; U.S. Pat. No. 6,262,563, issued Jul. 17, 2001, entitled METHOD AND APPARATUS FOR MEASURING COMPLEX ADMITTANCE OF CELLS AND BATTERIES; U.S. Pat. No. 6,294,896, issued Sep. 25, 2001; entitled METHOD AND APPARATUS FOR MEASURING COMPLEX SELF-IMMITANCE OF A GENERAL ELECTRICAL ELEMENT; U.S. Pat. No. 6,294,897, issued Sep. 25, 2001, entitled METHOD AND APPARATUS FOR ELECTRONICALLY EVALUATING THE INTERNAL TEMPERATURE OF AN ELECTROCHEMICAL CELL OR BATTERY; U.S. Pat. No. 6,304,087, issued Oct. 16, 2001, entitled APPARATUS FOR CALIBRATING ELECTRONIC BATTERY TESTER; U.S. Pat. No. 6,310,481, issued Oct. 30, 2001, entitled ELECTRONIC BATTERY TESTER; U.S. Pat. No. 6,313,607, issued Nov. 6, 2001, entitled METHOD AND APPARATUS FOR EVALUATING STORED CHARGE IN AN ELECTROCHEMICAL CELL OR BATTERY; U.S. Pat. No. 6,313,608, issued Nov. 6, 2001, entitled METHOD AND APPARATUS FOR CHARGING A BATTERY; U.S. Pat. No. 6,316,914, issued Nov. 13, 2001, entitled TESTING PARALLEL STRINGS OF STORAGE BATTERIES; U.S. Ser. No. 09/293,020, filed Apr. 16, 1999, entitled AUTOMOTIVE BATTERY CHARGING SYSTEM TESTER; U.S. Ser. No. 09/544,696, filed Apr. 7, 2000, entitled ELECTRONIC BATTERY TESTER; U.S. Ser. No. 09/304,315,filed May 3, 1999, entitled MIDPOINT BATTERY MONITOR"; U.S. Ser. No. 09/280,133, filed Mar. 26, 1999, entitled ELECTRONIC BATTERY TESTER; U.S. Ser. No. 09/560,920, filed Apr. 28, 2000, entitled MULTI-LEVEL CONDUCTANCE TESTER; U.S. Ser. No. 09/431,446, filed Nov. 1, 1999, entitled ALTERNATOR DIAGNOSTIC SYSTEM; U.S. Ser. No. 09/388,501, filed Sep. 1, 1999, entitled METHOD AND APPARATUS FOR EVALUATING STORED CHARGE IN AN ELECTROCHEMICAL CELL OR BATTERY; U.S. Ser. No. 09/703,270, filed Oct. 31, 2000, entitled ELECTRONIC BATTERY TESTER; U.S. Ser. No. 09/564,740, filed May 4, 2000, entitled ENERGY MANAGEMENT SYSTEM FOR AUTOMOTIVE VEHICLE; U.S. Ser. No. 09/575,629, filed May 22, 2000, entitled VEHICLE ELECTRICAL SYSTEM TESTER WITH ENCODED OUTPUT; U.S. Ser. No. 09/780,146, filed Feb. 9, 2001, entitled STORAGE BATTERY WITH INTEGRAL BATTERY TESTER; U.S. Ser. No. 09/575,627, filed May 22, 2000, entitled METHOD AND APPARATUS FOR CHARGING A BATTERY; U.S. Ser. No. 09/577,421, filed May 22, 2000, entitled METHOD AND APPARATUS FOR CHARGING A BATTERY; U.S. Ser. No. 09/816,768, filed Mar. 23, 2001, entitled MODULAR BATTERY TESTER; U.S. Ser. No. 09/662,401, filed Sep. 14, 2000, entitled TESTING PARALLEL STRINGS OF STORAGE BATTERIES; U.S. Ser. No. 09/654,715, filed Sep. 5, 2000, entitled APPARATUS FOR CALIBRATING ELECTRONIC BATTERY TESTER; U.S. Ser. No. 09/756,638, filed Jan. 8, 2001, entitled METHOD AND APPARATUS FOR DETERMINING BATTERY PROPERTIES FROM COMPLEX IMPEDANCE/ADMITTANCE; U.S. Ser. No. 09/862,783, filed May 21, 2001, entitled METHOD AND APPARATUS FOR TESTING CELLS AND BATTERIES EMBEDDED IN SERIES/PARALLEL SYSTEMS; U.S. Ser. No. 09/483,623, filed Jan. 13, 2000, entitled ALTERNATOR TESTER; U.S. Ser. No. 09/870,410, filed May 30, 2001, entitled INTEGRATED CONDUCTANCE AND LOAD TEST BASED ELECTRONIC BATTERY TESTER; U.S. Ser. No. 09/960,117, filed Sep. 20, 2001, entitled IN-VEHICLE BATTERY MONITOR; U.S. Ser. No. 09/908,389, filed Jul. 18, 2001, entitled BATTERY CLAMP WITH INTEGRATED CIRCUIT SENSOR; U.S. Ser. No. 09/908,278, filed Jul. 18, 2001, entitled BATTERY CLAMP WITH EMBEDDED ENVIRONMENT SENSOR; U.S. Ser. No. 09/880,473, filed Jun. 13, 2001; entitled BATTERY TEST MODULE; U.S. Ser. No. 09/876,564, filed Jun. 7, 2001, entitled ELECTRONIC BATTERY TESTER; U.S. Ser. No. 09/878,625, filed Jun. 11, 2001, entitled SUPPRESSING INTERFERENCE IN AC MEASUREMENTS OF CELLS, BATTERIES AND OTHER ELECTRICAL ELEMENTS; U.S. Ser. No. 09/902,492, filed Jul. 10, 2001, entitled APPARATUS AND METHOD FOR CARRYING OUT DIAGNOSTIC TESTS ON BATTERIES AND FOR RAPIDLY CHARGING BATTERIES; and U.S. Ser. No. 09/940,684, filed Aug. 27, 2001, entitled METHOD AND APPARATUS FOR EVALUATING STORED CHARGE IN AN ELECTROCHEMICAL CELL OR BATTERY; U.S. Ser. No. 09/977,049, filed Oct. 12, 2001, entitled PROGRAMMABLE CURRENT EXCITER FOR MEASURING AC IMMITTANCE OF CELLS AND BATTERIES; U.S. Ser. No. 10/047,923, filed Oct. 23, 2001, entitled AUTOMOTIVE BATTERY CHARGING SYSTEM TESTER, U.S. Ser. No. 10/046,659, filed Oct. 29, 2001, entitled ENERGY MANAGEMENT SYSTEM FOR AUTOMOTIVE VEHICLE; U.S. Ser. No. 09/993,468, filed Nov. 14, 2001, entitled KELVIN CONNECTOR FOR A BATTERY POST; U.S. Ser. No. 09/992,350, filed Nov. 26, 2001, entitled ELECTRONIC BATTERY TESTER, which are incorporated herein by reference in their entirety.

SUMMARY OF THE INVENTION

A charge control device for providing a constant charge voltage with temperature compensation to a battery being charged by a constant current charger is provided. The device includes a first electrical connector that couples to a positive terminal of the battery and a second electrical connector that couples to a negative terminal of the battery. A current bypass circuit electrically couples to the positive and negative terminals of the battery through respective first and second electrical connectors. The current bypass circuit includes a bypass path for a portion of a charge current from the constant current charger to flow, thereby maintaining a

DETAILED DESCRIPTION OF THE PREFERRED EMBODIMENTS

Figure 1:
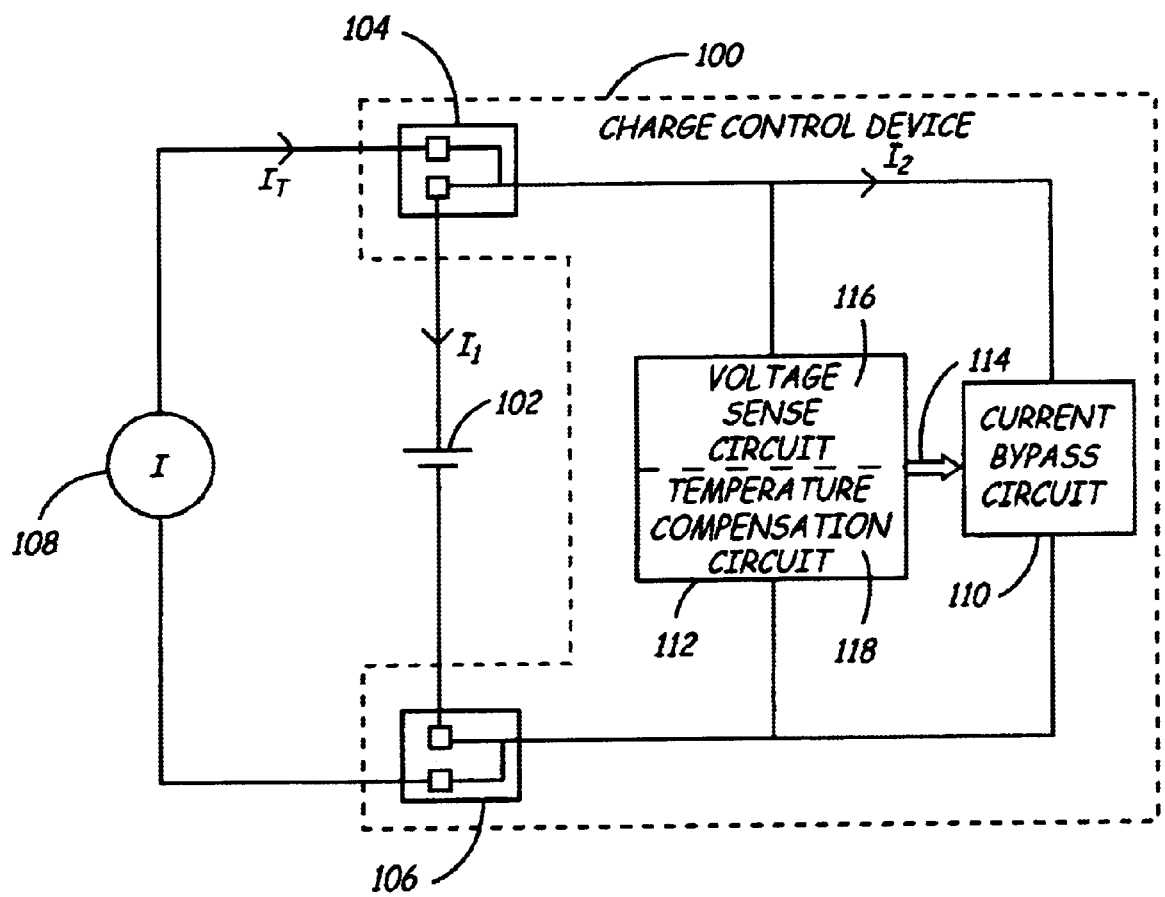
FIG. 1 illustrates a simplified block diagram of a charge control device in accordance with one example embodiment of the present invention.

FIG. 1 is a simplified block diagram of a basic implementation of a charge control device 100 in accordance with one example embodiment of the present invention. Device 100 can physically mount to a battery 102 (shown by a one-cell battery symbol for simplification) and includes electrical connectors 104 and 106 that electrically couple to terminals of battery 102. As can be seen in FIG. 1, a constant current charger 108 also electrically couples to terminals of battery 102 via electrical connectors 104 and 106. Device 100 is designed to provide a constant charge voltage with temperature compensation to battery 102 being charged by constant current charger 108. In the absence of charge control device 100, current $I_T$, supplied by constant current charger 108, would flow directly into battery 102 during the entire recharging cycle, which could lead to excessive overcharging of battery 102. The inclusion of charge control device 100 causes a portion of current $I_T$, which is designated by $I_2$, to flow through a current bypass circuit 110 and thereby maintain a substantially constant voltage across the terminals of battery 102. Device 100 also includes a voltage sense and temperature compensation circuit 112, described below, through which a negligible amount of current flows. Thus, current $I_T$ is essentially equal to the sum of currents $I_1$ and $I_2$. Voltage sense and temperature compensation circuit 112 senses changes in voltage across terminals of battery 102 and also senses changes in the temperature of battery 102 and accordingly provides an output 114 to current bypass circuit 110. The magnitude of current $I_2$, flowing through current bypass circuit 110, is adjusted as a function of output 114 provided by voltage sense and temperature compensation circuit 112. Voltage sense and temperature compensation circuit 112 may be divided into a separate voltage sense circuit 116 and a temperature compensation circuit 118.

Figure 2:
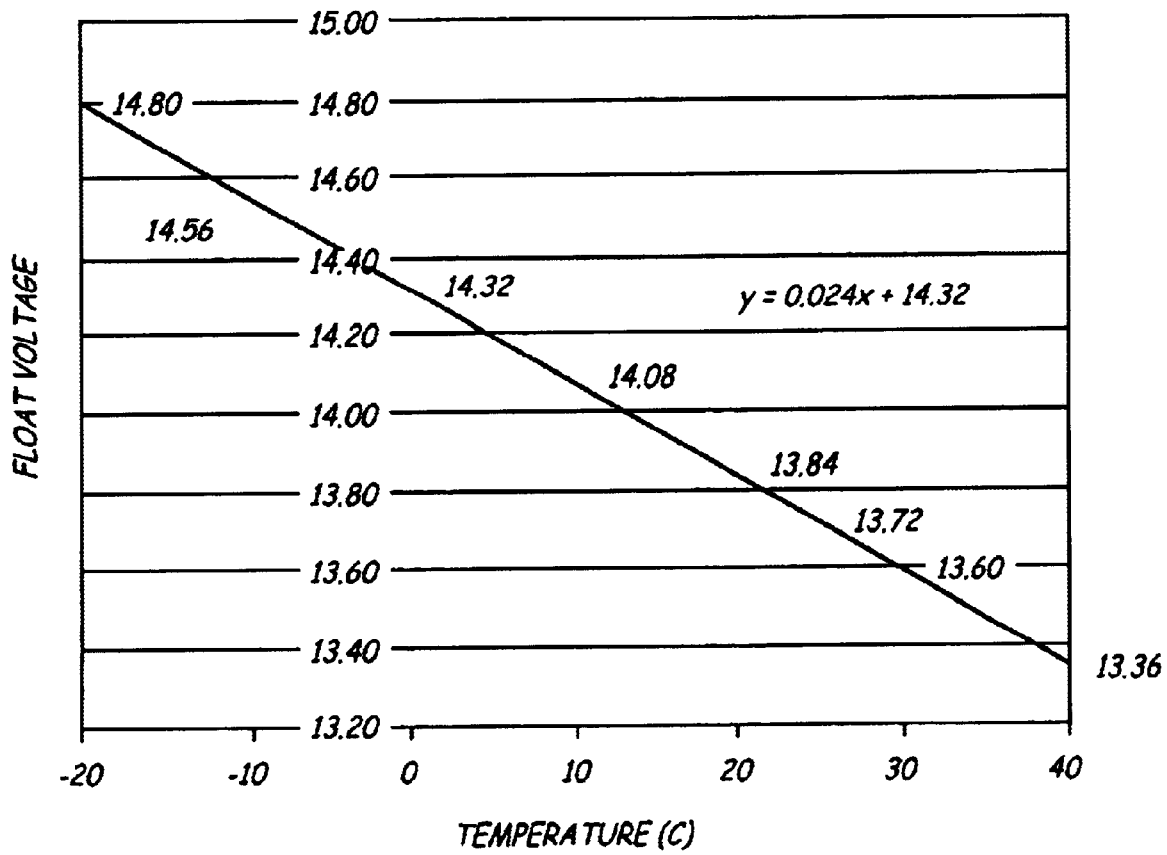
FIG. 2 is a charge control float curve for an automobile battery.

Temperature based voltage regulation across battery 102 is carried out by device 100 in accordance with a voltage vs. temperature graph of "compensating" or "float" voltages for the type of battery employed. Voltage vs. temperature graphs vary (have different slopes) for different types of batteries. FIG. 2 shows an exemplary charge control float curve for a nominal automobile lead-acid battery. The nominal float voltage, plotted along the vertical axis, changes as a function of battery temperature that is plotted along the horizontal axis in degrees Centigrade. The relationship between the nominal float voltage and the temperature in degrees Centigrade is given according to Equation 1 below.

$$Y = -0.024X + 14.32 \qquad \text{Equation. 1}$$

where Y is the nominal float voltage and X is the temperature in degrees Centigrade.

As mentioned above, device 100 is designed to provide a constant charge voltage with temperature compensation to battery 102 being charged by constant current charger 108. Thus, at a particular battery temperature, device 100 maintains a substantially constant voltage across the terminals of battery 102. In response to changes in the temperature of battery 102, during its recharging cycle, device 100 changes the voltage applied to the battery 102. Device 100 achieves temperature-based voltage regulation with the help of a temperature-sensing element (not shown in FIG. 1) included in voltage sense and temperature compensation circuit 112. Circuit 112 outputs a voltage which is proportional to the sensed temperature. This output voltage is provided to the current bypass circuit 110 which causes the magnitude of current $I_2$ to change, thereby changing the voltage applied across battery 102. Details of the components and operation of device 100 are provided in connection with FIG. 3, described below.

Figure 3:
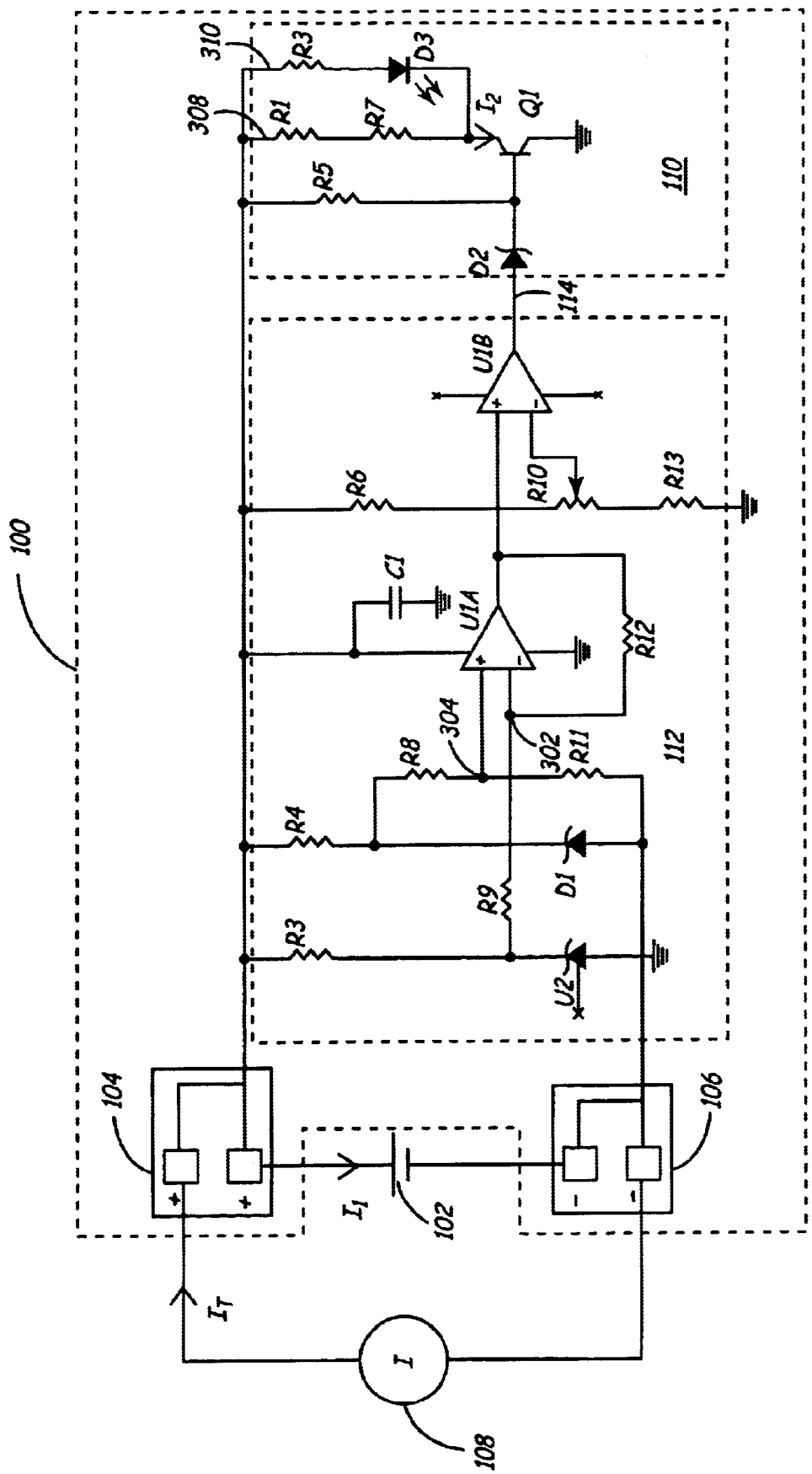
FIG. 3 is an example of a detailed implementation of a charge control device in accordance with an embodiment of the present invention.

FIG. 3 is an example of a detailed implementation of charge control device 100 in accordance with an embodiment of the present invention. In FIG. 3, voltage sense and temperature compensation circuit 112 includes an operational amplifier U1A with a temperature stable voltage applied to its non-inverting input at node 304 and a temperature variable voltage applied to the inverting input at node 302. The temperature stable voltage is maintained by Zener diode D1. The temperature variable voltage is provided by precision temperature sensor U2 which senses the battery temperature and produces a voltage output proportional to the temperature sensed. For example, when the temperature of battery 102 increases, temperature sensor U2 senses this increase in temperature and outputs a change in voltage proportional to the sensed temperature increase, which causes the temperature variable voltage at the inverting input of U1A to increase. This increase in voltage is amplified by operational amplifier U1A and appears as an inverted amplified output at node 306 because the temperature variable voltage is connected to the inverting input of U1A. This inverted amplified output is applied to the non-inverting input of second operational amplifier U1B. The output of U1B, which is the output 114 of voltage sense and temperature compensation circuit 112, is input to current bypass circuit 110. In this example, a drop in voltage at the base of transistor Q1, as a result of the output from U1B, causes transistor Q1, which operates in linear mode, to allow an increase in magnitude of bypass current $I_2$. An increase in current $I_2$ results in decrease in voltage across battery 102. This decrease in voltage across battery 102 is proportional to the increase in temperature of battery 102. In general, the increase or decrease in voltage applied to battery 102 is carried out in accordance with the float curve shown in FIG. 2.

As battery 102 charges, the difference between the charging voltage, applied by device 100, and the battery voltage decreases. When battery 102 is charged, current $I_1$ is just a trickle and almost all of current $I_T$ flows through bypass circuit 110. Thus, when battery 102 is charged, bypass current $I_2$ is large and substantially equal to $I_T$. Since $I_2$ is the sum of the current through branch 308 and branch 310, an increase in $I_2$ is accompanied by corresponding increases in current in branches 308 and 310. Branch 310 includes an LED D3 which lights to indicate that the battery 102 is charged when the current through branch 310 increases above a predetermined threshold.

In addition to the components described above, device 100 also includes resistor R5 and diode D2 that provide a path for leakage current during the initialization of device 100. Resistors R1 and R7 in branch 308 and resistor R2 in branch 310 are a part of the bypass current path. Resistors R3 and R4 are used to provide a proper voltage drop to ensure that operational amplifier U1A operates within its optimum voltage range. Resistors R8 and R11 provide a voltage divider for the non-inverting input of operational amplifier U1A. Similarly, resistors R6, R10 and R13 form a voltage divider for the inverting input of operational amplifier U1B. Capacitor C1 is included in circuit 106 for noise suppression. Resistor R9, which is in series with the inverting input of amplifier U1A, and feedback resistor R12 are selected based on the gain required for operational amplifier U1A.

As mentioned above, the increase or decrease in voltage applied to battery 102 is carried out in accordance with the charge control float graph, which is a straight line, shown in FIG. 2. The slope of the straight line is different for different types of batteries. By setting the ratio of resistors R12 and R9, circuit 100 (FIG. 3) is configured to operate in accordance with a particular slope for a particular battery type. An offset of provided by resistor R10. When a different type of battery is employed, the ratio of resistors R12 and R9 is changed for circuit 100 to operate in accordance with a charge control graph having a different slope.

A list of the various components that may be used in the circuit of FIG. 3 are provided in Table 1 below.

| C1 | 0.047μ | R3 | 18 KΩ | R10 | 20 KΩ |
|---|---|---|---|---|---|
| D1 | LM4040 | R4 | 62 KΩ | R11 | 1 MΩ |
| D2 | 3.3 V | R5 | 10 KΩ | R12 | 1 MΩ |
| D3 | LED | R6 | 287 KΩ | R13 | 200 KΩ |
| Q1 | MJD45H11 | R7 | 68 KΩ | U1A | LM2904M |
| R1 | 68 Ω | R8 | 150 KΩ | U1B | LM2904M |
| R2 | 300 Ω | R9 | 1 MΩ | U2 | LM355M |

Although the present invention has been described with reference to preferred embodiments, workers skilled in the art will recognize that changes may be made in form and detail without departing from the spirit and scope of the invention. The invention is not limited to the specific physical implementation shown herein. Any appropriate hardware, software or other combination can be employed to provide the current bypass circuit of the invention.

What is claimed is:

1. A charge control device for providing a constant charge voltage with temperature compensation to a battery being charged by a constant current charger, comprising:
    a first electrical connector adapted to couple to a positive terminal of the battery;
    a second electrical connector adapted to couple to a negative terminal of the battery; and
    a current bypass circuit adapted to electrically couple to the positive and negative terminals of the battery through respective first and second electrical connectors, the current bypass circuit including a bypass path for a portion of a charge current from the constant current charger to flow when the positive and negative terminals of the battery are electrically coupled to the constant current charger, thereby maintaining a substantially constant voltage across the battery terminals at a particular temperature.

2. The device of claim 1 further comprising a voltage sense circuit electrically coupled to the current bypass circuit, the voltage sense circuit adapted to sense changes in voltage across the positive and negative battery terminals and to produce an output signal in response to the sensed voltage changes.

3. The device of claim 2 wherein the current bypass circuit is adapted to receive the output signal from the voltage sense circuit and to vary the portion of the charge current flowing through the bypass path in response to the received output signal.

4. The device of claim 1 further comprising a temperature compensation circuit electrically coupled to the current bypass circuit, the temperature compensation circuit adapted to sense changes in a temperature of the battery and to produce an output signal in response to the sensed battery temperature changes.

5. The device of claim 4 wherein the current bypass circuit is adapted to receive the output signal from the temperature compensation circuit and to vary the portion of the charge current flowing through the bypass path in response to the received output signal.

6. The device of claim 1 wherein the current bypass circuit further comprises an LED that indicates a charge status of the battery.

7. A method of providing a constant charge voltage with temperature compensation to a battery being charged by a constant current charger, comprising:
    (a) providing a first electrical connector adapted to couple to a positive terminal of the battery;
    (b) providing a second electrical connector adapted to couple to a negative terminal of the battery; and
    (c) providing a current bypass circuit adapted to electrically couple to the positive and negative terminals of the battery through respective first and second electrical connectors, the current bypass circuit including a bypass path for a portion of a charge current from the constant current charger to flow when the positive and negative terminals of the battery are electrically coupled to the constant current charger, thereby maintaining a substantially constant voltage across the battery terminals at a particular temperature.

8. The method of claim 7 further comprising sensing changes in voltage across the positive and negative battery terminals and producing an output signal in response to the sensed voltage changes.

9. The method of claim 8 further comprising controlling the portion of the charge current flowing through the bypass path as a function of the output signal produced in response to the sensed voltage changes.

10. The method of claim 7 sensing changes in a temperature of the battery and producing an output signal in response to the sensed battery temperature changes.

11. The method of claim 10 further comprising controlling the portion of the charge current flowing through the bypass path as a function of the output signal produced in response to the sensed battery temperature changes.

12. A charge control device for providing a constant charge voltage with temperature compensation to a battery being charged by a constant current charger, comprising:
    a voltage sense and temperature compensation circuit adapted to connect across two terminals of the battery, and to sense changes in a temperature of the battery and to produce an output signal in response to the sensed battery temperature changes; and
    a current bypass circuit electrically coupled to the voltage sense and temperature compensation circuit, the current bypass circuit including a bypass path for a portion of a charge current from the constant current charger to flow when the two terminals of the battery are electrically coupled to the constant current charger, thereby maintaining a substantially constant voltage across the battery terminals at a particular temperature, the current bypass circuit adapted to vary the portion of the charge current flowing through the bypass path in response to the output signal received from the voltage sense and temperature compensation circuit.

13. The device of claim 12 wherein the current bypass circuit further comprises an LED that indicates a charge status of the battery.

* * * * *